(12) United States Patent
Ozaki et al.

(10) Patent No.: US 11,663,887 B2
(45) Date of Patent: May 30, 2023

(54) TOUCH PANEL FOR AN INFORMATION PROCESSING APPARATUS

(71) Applicant: PANASONIC INTELLECTUAL PROPERTY MANAGEMENT CO., LTD., Osaka (JP)

(72) Inventors: Kaoru Ozaki, Kanagawa (JP); Tomohito Takakura, Kanagawa (JP); Yohei Tsuyuguchi, Kanagawa (JP); Yasuyuki Tanaka, Kanagawa (JP); Kyohei Kida, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 18 days.

(21) Appl. No.: 17/575,312

(22) Filed: Jan. 13, 2022

(65) Prior Publication Data

US 2023/0039232 A1  Feb. 9, 2023

(30) Foreign Application Priority Data

Aug. 6, 2021  (JP) .............................. JP2021-129851

(51) Int. Cl.
*G07G 1/10* (2006.01)
*G06F 3/039* (2013.01)
*G07F 7/08* (2006.01)

(52) U.S. Cl.
CPC .............. *G07G 1/10* (2013.01); *G06F 3/0393* (2019.05); *G07F 7/0873* (2013.01)

(58) Field of Classification Search
CPC ...... G07G 1/10; G07G 1/0081; G07F 7/0873; G07F 7/088; G07F 7/0886

USPC ........................................................... 235/12
See application file for complete search history.

(56) References Cited

U.S. PATENT DOCUMENTS

| 6,065,679 A * | 5/2000 | Levie ................... H05K 1/0275 |
| | | 235/462.47 |
| 2008/0225471 A1 | 9/2008 | Takizawa |
| 2010/0302186 A1 | 12/2010 | Amemiya |
| 2012/0287051 A1 | 11/2012 | Takabu |

FOREIGN PATENT DOCUMENTS

| JP | 2008-235326 | 10/2008 |
| JP | 2010-282254 | 12/2010 |
| JP | 3169346 U | 7/2011 |
| JP | 2011-180828 | 9/2011 |
| JP | 2012-018478 | 1/2012 |
| JP | 2018-085558 | 5/2018 |
| JP | 2019-003473 | 1/2019 |
| KR | 10-1128104 | 3/2012 |

* cited by examiner

*Primary Examiner* — Suezu Ellis
(74) *Attorney, Agent, or Firm* — Greenblum & Bernstein, P.L.C.

(57) ABSTRACT

An information processing apparatus includes: a body having a top configured to allow a touch panel to be disposed thereon; and an input auxiliary device. The input auxiliary device includes: a frame including a first holding piece and a second holding piece configured to hold one side and another side of the body, respectively, to mount the frame on the top; and a key unit attachable to a backside of the frame. The one side includes: a card slot; and a second underside extending along the top toward the another side between the top and the card slot. The first holding piece is configured to be locked to the second underside.

8 Claims, 11 Drawing Sheets

TOUCH PANEL FOR AN INFORMATION PROCESSING APPARATUS

CROSS-REFERENCE TO RELATED APPLICATIONS

This application is based on and claims the benefit of priority of Japanese Patent Application No. 2021-129851 filed on Aug. 6, 2021, the entire contents of which are incorporated herein by reference.

FIELD

The present disclosure relates to an information processing apparatus.

BACKGROUND

JP-A-2011-180828 describes a product sales data processing apparatus in which a touch panel can be operated with a key. The product sales data processing apparatus includes a display device pivotally supported by a housing so as to be opened and closed and is capable of inputting and displaying product information to be traded. The display device includes a display provided to an outer shell member, a touch panel including a plurality of detection units to which input processing is assigned, and an auxiliary key for operating the detection units. The auxiliary key is detachably provided to a fixing portion provided to the outer shell member.

SUMMARY

In the product sales data processing apparatus described in JP-A-2011-180828, the fixing portion for fixing the auxiliary key is exclusively provided to the outer shell member. Therefore, it is necessary to reserve a space for the fixing portion in the apparatus, and it is difficult to reduce the entire size of the product sales data processing apparatus while providing devices for reading various cards using the apparatus as a payment terminal.

The present disclosure has been made in view of the above circumstances, and an object thereof is to provide an information processing apparatus capable of assisting input by a touch panel and capable of reducing the size of the information processing apparatus including the touch panel while the information processing apparatus is equipped with various devices.

According to an aspect of the present disclosure, there is provided an information processing apparatus including: a body having a top configured to allow a touch panel to be disposed thereon; and an input auxiliary device configured to assist input by the touch panel, wherein the touch panel has a length in a first direction longer than a length in a second direction perpendicular to the first direction, wherein the input auxiliary device includes: a frame having a plurality of first through holes, the frame including a first holding piece configured to hold one side of the body in the first direction and a second holding piece configured to hold another side of the body in the first direction to mount the frame on the top; and a key unit attachable to a backside of the frame facing the touch panel, wherein the key unit includes: a plurality of key tops formed of a conductive object, the plurality of key tops being configured to be inserted into the first through holes, respectively; and a base frame configured to support the plurality of key tops to allow the plurality of key tops to be pushed down, the base frame having a first underside facing the touch panel, the first underside being configured to contact the touch panel, wherein the one side includes: a card slot; and a second underside extending along the top toward the another side between the top and the card slot, and wherein the first holding piece is configured to be locked to the second underside.

According to the present disclosure, the input by the touch panel can be assisted, and the size of the information processing apparatus including the touch panel can be reduced while the information processing apparatus is equipped with various devices.

DETAILED DESCRIPTION

Hereinafter, embodiments specifically disclosing an information processing apparatus and an input auxiliary device according to the present disclosure will be described in detail with reference to the drawings as appropriate. However, an unnecessarily detailed description may be omitted. For example, a detailed description of a well-known matter or a repeated description of substantially the same configuration may be omitted. This is to avoid unnecessary redundancy in the following description and to facilitate understanding of those skilled in the art. The accompanying drawings and the following descriptions are provided for those skilled in the art to fully understand the present disclosure, and are not intended to limit a subject matter of the claims.

Figure 1:
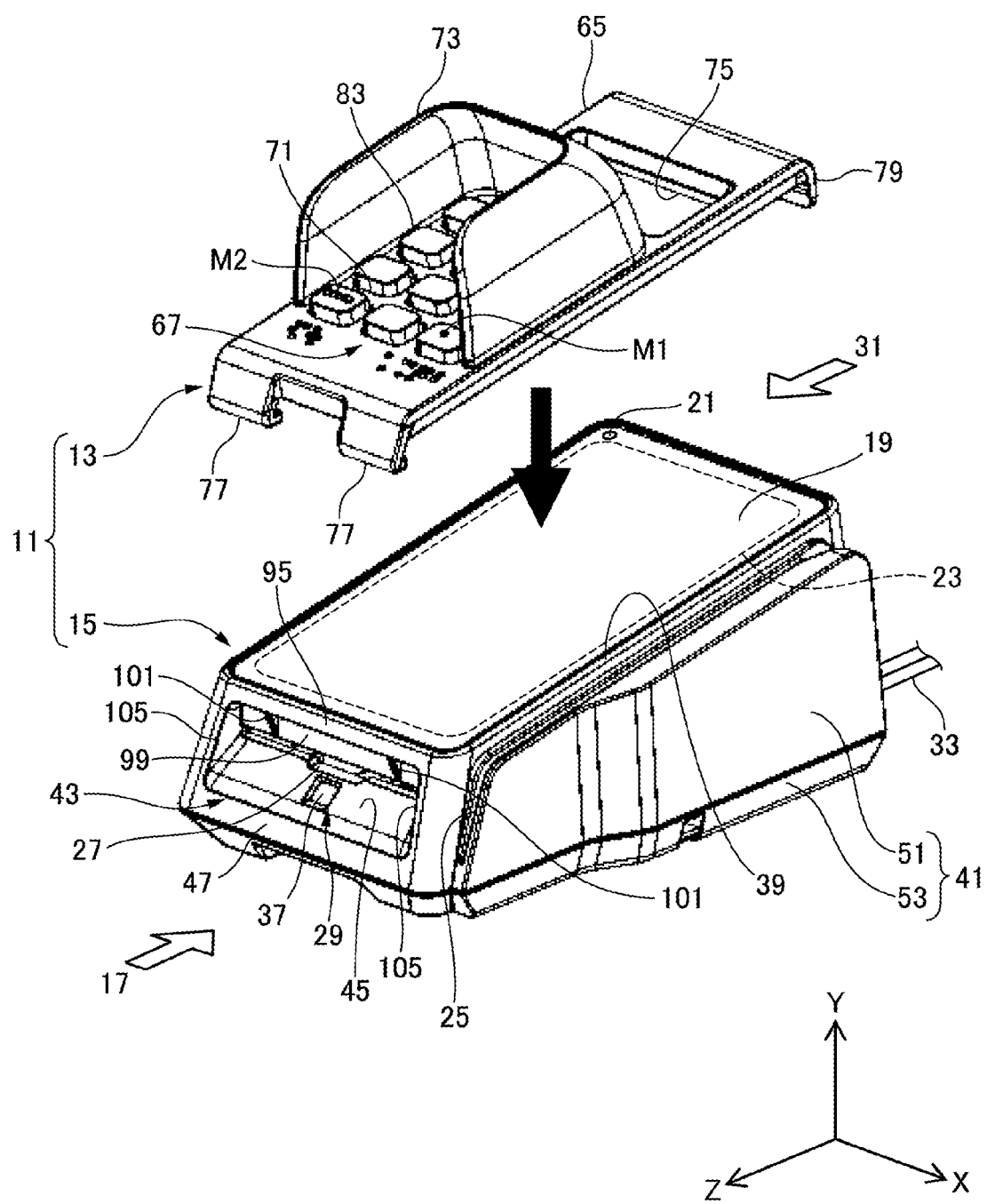
FIG. 1 is an exploded perspective view of an information processing apparatus according to a first embodiment and an input auxiliary device of the information processing apparatus.

FIG. 1 is an exploded perspective view of an information processing apparatus 11 according to a first embodiment and an input auxiliary device 13 of the information processing apparatus 11.

Each direction in the present embodiment follows a direction of an arrow attached to an X-axis, a Y-axis, and a Z-axis shown in each drawing. Here, the X-axis direction is a direction parallel to a horizontal plane. The Y-axis direction is a direction perpendicular to the horizontal plane and parallel to a vertical direction. The Z-axis direction is a direction parallel to the horizontal plane and perpendicular to the X-axis direction. In the present embodiment, the X-axis direction is also referred to as a left-right direction, a +X direction (X-axis positive direction) is also referred to as a rightward direction, and a −X direction (X-axis negative direction) is also referred to as a leftward direction. The Y-axis direction is also referred to as an up-down direction, a +Y direction (Y-axis positive direction) is also referred to as an upward direction, and a −Y direction (Y-axis negative direction) is also referred to as a downward direction. The Z-axis direction is also referred to as a front-back direction, a +Z direction (Z-axis positive direction) is also referred to as a frontward direction, and a −Z direction (Z-axis negative direction) is also referred to as a backward direction. In each of the drawings, a circle surrounding a point at an intersection of the orthogonal axes indicates a direction from a back side of a paper surface to a front side of the paper surface, and a circle surrounding X at the intersection of the orthogonal axes indicates a direction from the front side of the paper surface to the back side of the paper surface.

The information processing apparatus 11 is, for example, a stationary apparatus, and is used by being placed on a horizontal plane (for example, a table). In FIG. 1, a lateral direction of a bottom of the information processing apparatus 11 is along the X-axis direction, and a longitudinal direction of the bottom of the information processing apparatus 11 is along the Z-axis direction. The information processing apparatus 11 is, for example, a payment processing apparatus.

The information processing apparatus 11 includes a body 15. The body 15 has a box shape. A user operates the information processing apparatus 11 from a front 17 of the information processing apparatus 11. The user may be a purchaser of a product or a customer in a store. The information processing apparatus 11 is connected to a store terminal (not shown) operated by a store clerk. The information processing apparatus 11 is capable of executing various types of payment processing in cooperation with the store terminal. The store terminal executes, for example, input of a product, input of an amount of money, and selection of a payment method via an input device of the store terminal.

The information processing apparatus 11 includes a touch panel 19, a light emitting diode (LED) 21, a near field communication (NFC) antenna 23, a first card slot 25, a second card slot 27, and a camera 29. The information processing apparatus 11 includes a cable 33 on a back 31. Examples of the cable 33 may include a power cable, a communication cable, a local area network (LAN) cable, and a universal serial bus (USB) cable.

The information processing apparatus 11 is a composite type apparatus capable of executing payment processing in accordance with a plurality of payment methods. The information processing apparatus 11 can be used, for example, in a state of being placed on a placement surface (not shown) of a counter (not shown) of a store. The information processing apparatus 11 may execute the payment processing in accordance with any one of the payment methods.

Examples of the plurality of payment methods include credit card payment, electronic money payment, code (such as a QR code (registered trademark)) payment, and cash payment. Examples of the credit card payment include magnetic card payment, contact IC card payment, and contactless IC card payment. As for the electronic money, a plurality of types of electronic money may exist. The electronic money payment and the contactless IC card payment are also collectively referred to as contactless payment since the electronic money payment and the contactless IC card payment are performed using contactless communication (for example, near field communication (NFC)).

The plurality of payment methods are executed using a plurality of corresponding payment interfaces. Examples of the plurality of payment interfaces include a credit card, an electronic money card, a code, and cash. Examples of the credit card include a magnetic card, a contact IC card, and a contactless IC credit card.

The magnetic card is used for payment by being inserted into the first card slot 25. The contact IC card is used for payment by being inserted into the second card slot 27. The contactless IC credit card and the electronic money card are used for payment by approaching the NFC antenna 23. The contactless IC credit card and the electronic money card are also collectively referred to as a "contactless IC card".

The camera 29 includes a camera module 35 (see FIG. 3) and a lens 37. In the information processing apparatus 11, the NFC antenna 23 and the touch panel 19 may have the same height from the placement surface. That is, in the information processing apparatus 11, the NFC antenna 23 may be disposed around the touch panel 19 on the same plane. A surface on which the touch panel 19 is to be disposed is also referred to as a panel arrangement surface 39. The panel arrangement surface 39 may be, for example, a top of the body 15. In the information processing apparatus 11 according to the present embodiment, a side on which the panel arrangement surface 39 is to be formed is referred to as a top side, and an opposite side thereof is referred to as an under side.

The first card slot 25 is disposed along a side on a right side or a left side as viewed from the front 17, for example, on the right side in FIG. 1. In this case, the user can easily select any payment method from the plurality of payment methods corresponding to the plurality of devices arranged in front of the eyes.

In the information processing apparatus 11, a height of the back 31 is larger than that of the front 17. That is, the panel arrangement surface 39 of the body 15 of the information processing apparatus 11 is gradually lowered toward a user side. That is, when the user faces the second card slot 27 in front, the panel arrangement surface 39 of the information processing apparatus 11 is oriented obliquely upward toward the user.

The LED 21 is disposed on the panel arrangement surface 39 of the body 15 of the information processing apparatus 11. An arrangement position of the LED 21 is not limited to this example, and may be any position that can be visually recognized by the user. The LED 21 can be used, for example, for displaying a power-supply state of a power source.

The touch panel 19 is used for payment by the user, for example. The touch panel 19 has a rectangular shape that is long in the front-back direction of the information processing apparatus 11. The touch panel 19 may be provided over the entire surface of the panel arrangement surface 39 or may be provided on a part of the panel arrangement surface 39. The touch panel 19 has an input function for receiving various operations performed by the user and inputting various pieces of data and information. The touch panel 19 has a display function for displaying various pieces of data, information, images, and the like. Therefore, the touch panel 19 can provide visual information to the user. On the touch panel 19, an input detection region where an input is detected and a display region where various types of displays are performed may be the same region, or at least part of the input detection region and the display region may be different regions. The touch panel 19 is shown as an input unit for the user, but the information processing apparatus 11 may include other input units (for example, an input auxiliary device including physical keys or buttons to be described later).

The information processing apparatus 11 includes, on the front 17, an opening portion 43 in which a housing 41 of the body 15 is absent. An opening of the opening portion 43 is the widest on the front, and is narrowed toward the back 31. That is, a diameter of the opening portion 43 increases from the back toward the front. The second card slot 27 and the lens 37 of the camera 29 are disposed in the opening portion 43. For example, the second card slot 27 is located at a part of the opening portion 43 on a backmost side.

An inclined lower surface 45 is disposed at a lower portion of a periphery of the opening portion 43. The inclined lower surface 45 forms a tapered surface that gradually separates from the panel arrangement surface 39 from the back toward the front. The inclined lower surface 45 is formed in, for example, a substantially planar shape. A lower frame surface 47 and the inclined lower surface 45 are connected to each other. The lower frame surface 47 is at a lower portion around the opening portion 43 on the front of the body 15 of the information processing apparatus 11. The lens 37 of the camera 29 is disposed at a central portion of the inclined lower surface 45 in the left-right direction.

A front of the lens 37 is not covered with the housing 41 of the body 15. Therefore, the camera 29 can introduce light from an outside of the information processing apparatus 11. In addition, the lens 37 is disposed on the inclined lower surface 45, so that a finger of the user, dust, or the like at the time of payment is not likely to reach the lens 37, and the lens 37 is protected from damage or adhesion of dirt.

Figure 2:
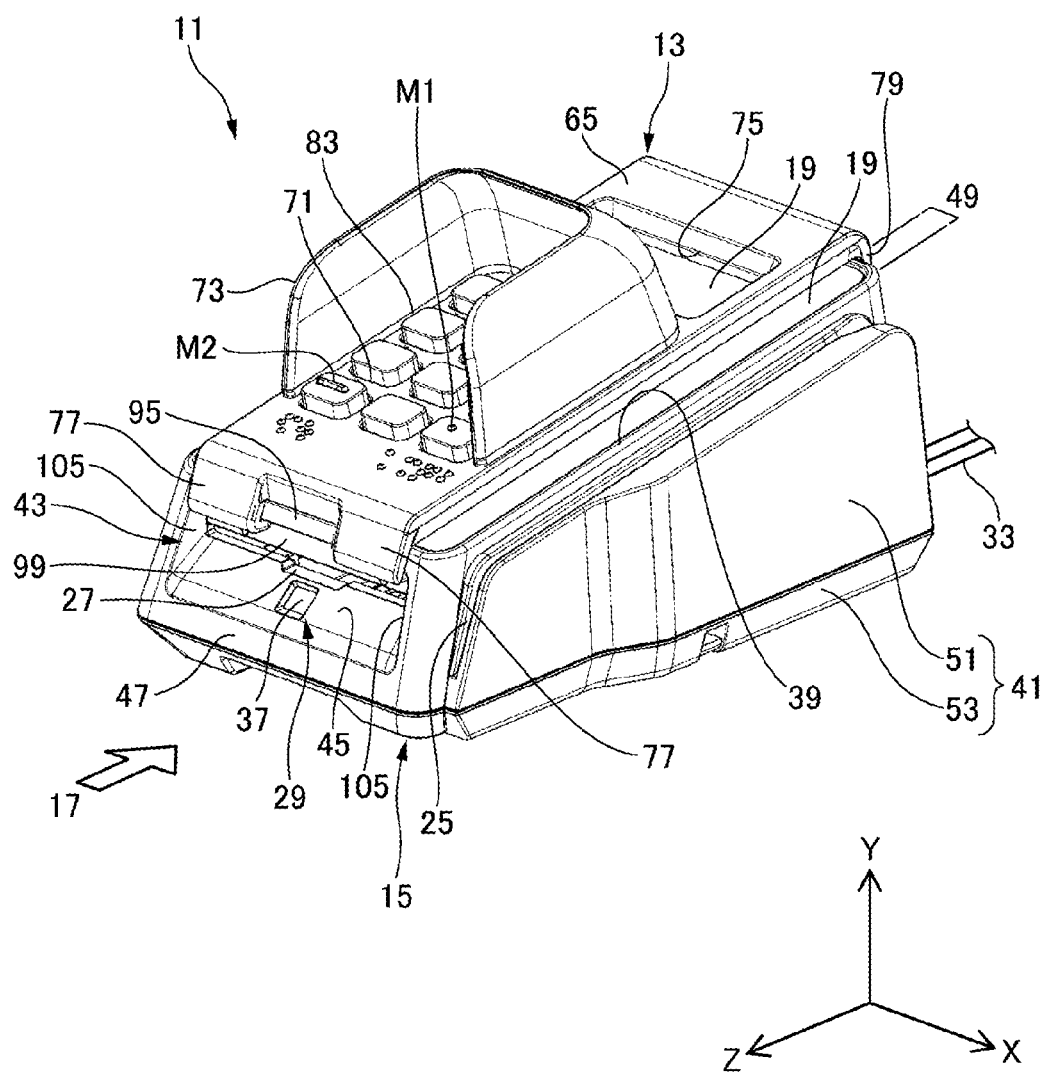
FIG. 2 is a perspective view of the information processing apparatus mounted with the input auxiliary device.

FIG. 2 is a perspective view of the information processing apparatus 11 mounted with the input auxiliary device 13.

The information processing apparatus 11 includes the input auxiliary device 13 for assisting input by the touch panel 19. The input auxiliary device 13 is mounted on the top of the body 15 such that inner vicinity portions (hereinafter, referred to as edges 49) of a pair of parallel long sides (sides along the X-axis direction) of the touch panel 19 are exposed. Since the input auxiliary device 13 is mounted on the body 15 with the front and the back of the information processing apparatus 11 held therebetween, the left and right edges 49 of the touch panel 19 are exposed in a state of protruding from the input auxiliary device 13 (see FIG. 6).

Figure 3:
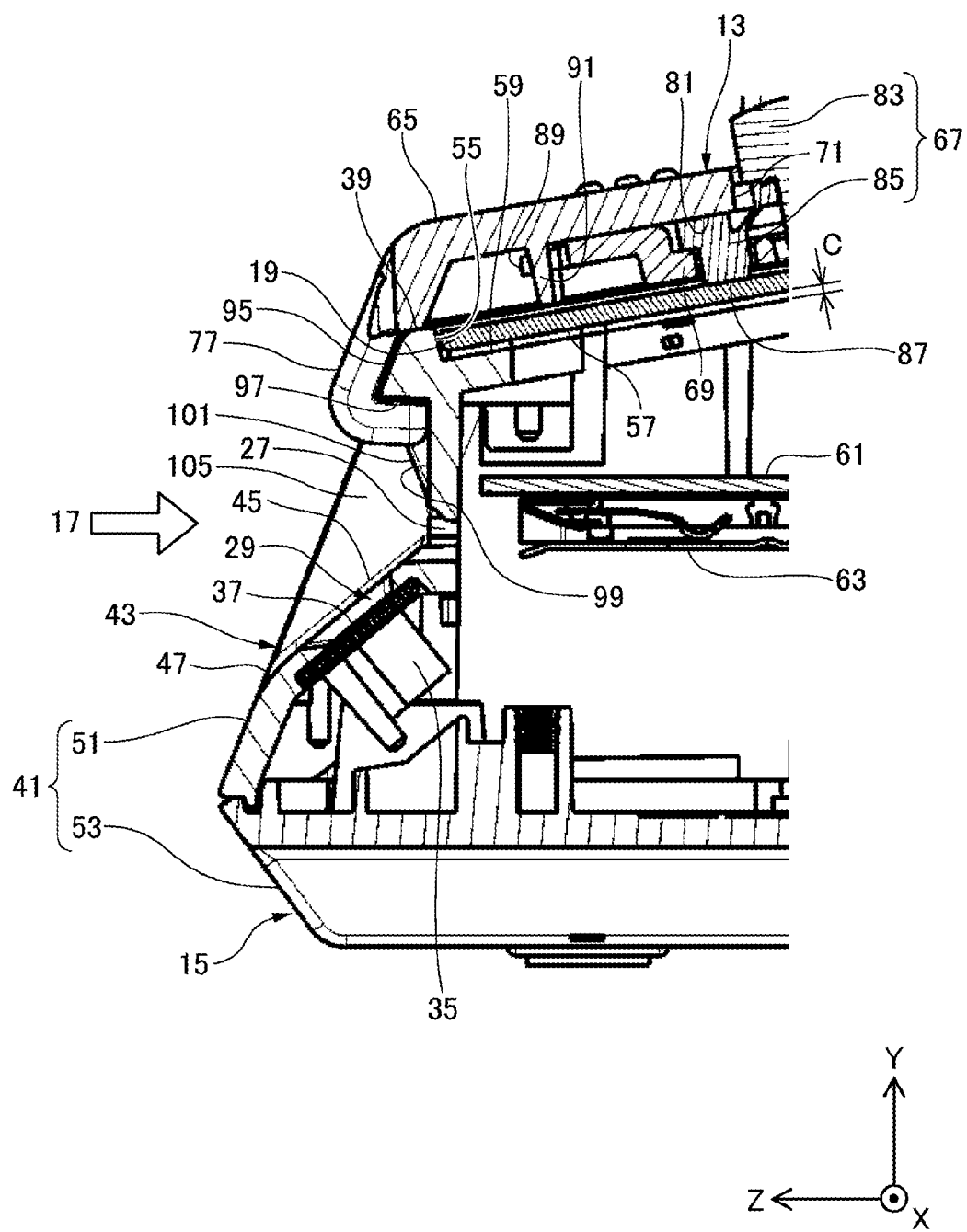
FIG. 3 is an enlarged cross-sectional view of a main portion of the information processing apparatus mounted with the input auxiliary device, which is obtained by notching a vicinity of an opening portion in a YZ plane.

FIG. 3 is an enlarged cross-sectional view of a main portion of the information processing apparatus 11 mounted with the input auxiliary device 13, which is obtained by notching a vicinity of the opening portion 43 in a YZ plane.

The housing 41 of the body 15 includes an upper case 51 on which the panel arrangement surface 39 is to be formed, and a lower case 53 to be attached to a lower side of the upper case 51. A panel attachment opening portion 55 is formed in the panel arrangement surface 39 of the upper case 51. A stepped portion 59 on which an edge 57 of the touch panel 19 is to be placed is formed on an inner periphery of the panel attachment opening portion 55. That is, the touch panel 19 is disposed on the panel arrangement surface 39 of the upper case 51 by placing the edge 57 on the stepped portion 59.

A substrate 61 having a rectangular shape that is long in the front-back direction is fixed to a substantially central portion of the upper case 51 in the up-down direction. A second card reader 63 for reading a contact IC card to be inserted from the second card slot 27 is fixed to a surface of the substrate 61 opposite to the touch panel 19.

Figure 4:
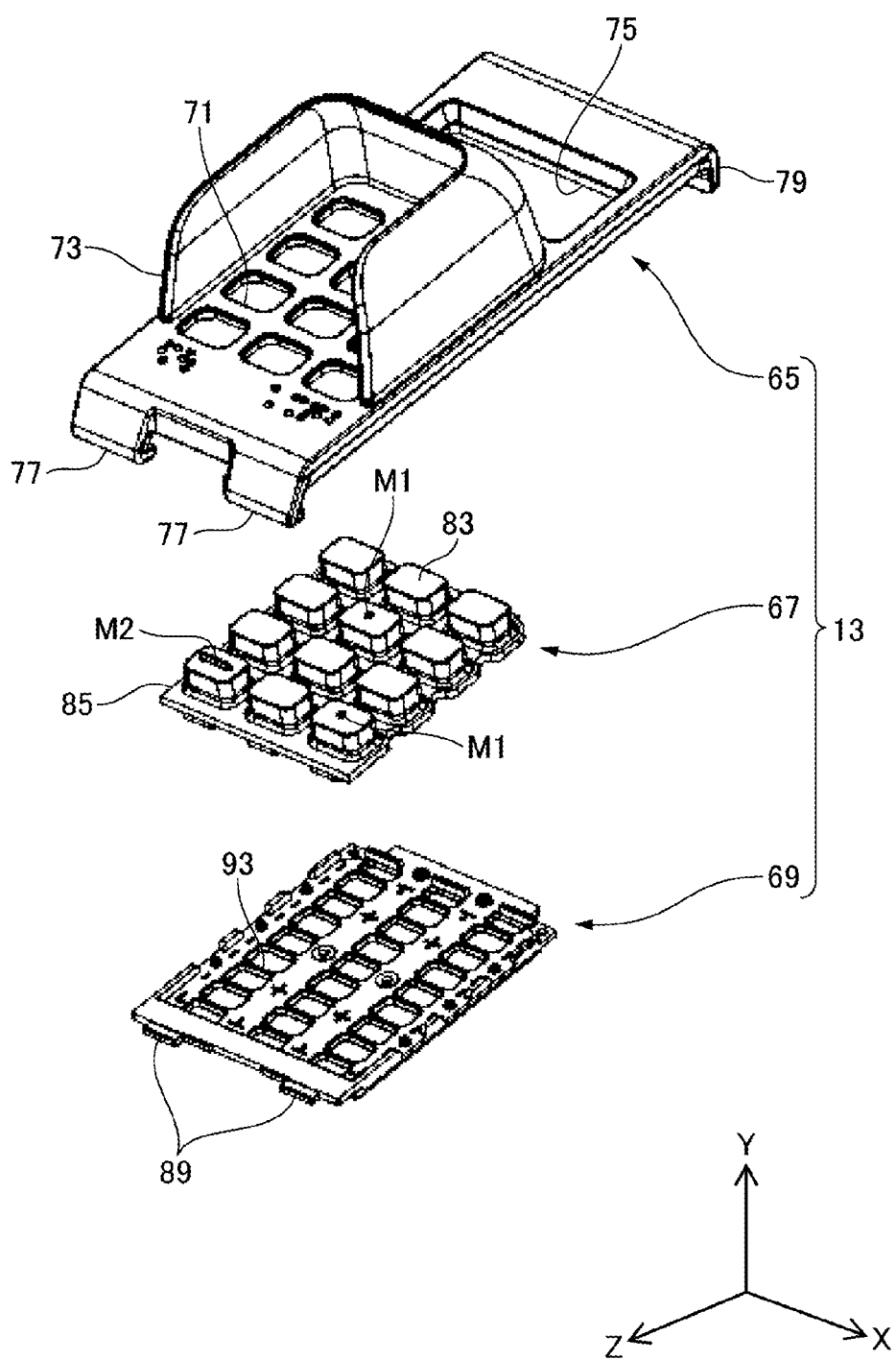
FIG. 4 is an exploded perspective view of the input auxiliary device.

FIG. 4 is an exploded perspective view of the input auxiliary device 13.

The input auxiliary device 13 includes a frame 65, a key unit 67, and a cover 69. The frame 65 has a plurality of through holes 71 (an example of first through holes). Each of the through holes 71 has, for example, a quadrangular shape, and in FIG. 4, four through holes 71 are arranged in the front-back direction (Z-axis direction) and three through holes 71 are arranged in the left-right direction (X-axis direction) in a grid pattern. A shape, the number, or the like of the through holes 71 are not limited thereto. A hood portion 73 is formed upright on the frame 65 so as to surround a region where the through holes 71 are arranged from three directions (in FIG. 4, the backward direction (−Z direction) and the left-right direction (+X direction, −X direction)). The hood portion 73 is provided to block a line of sight so that input keys used for an operation of a personal identification number or the like cannot be visually recognized by another person. In addition, in the frame 65, a window 75 is formed on an upper side of the hood portion 73 so that a part of display information to be displayed on the touch panel 19 can be visually recognized.

The frame 65 includes front holding pieces 77 and a back holding piece 79 that hold the front 17 and the back 31 of the body 15 therebetween. The frame 65 is mounted on the top of the body 15 by holding the front 17 and the back 31 of the body 15 with the front holding pieces 77 and the back holding piece 79. The front holding pieces 77 include a pair of left and right front holding pieces 77 by a notch portion provided at a central portion in the left-right direction. The back holding piece 79 is formed in a single plate shape continuously in the left-right direction. As shown in FIG. 3, the front holding piece 77 is formed in an L-shaped hook shape in a side view (when viewed from the +X direction). The back holding piece 79 is formed by bending a back edge of the frame 65 parallel to the back 31 of the body 15.

The key unit 67 is attached to a backside 81 (see FIG. 3) of the frame 65 facing the touch panel 19. The key unit 67 includes a plurality of key tops 83 and a base frame 85. The key tops 83 are made of conductive rubber, and are inserted into the respective through holes 71. Dot-shaped first physical marks M1 and a linear second physical mark M2, which can be determined by a tactile sensation, are attached to the key tops 83 disposed at specific positions. In FIG. 4, the plurality of key tops 83 arranged along an XZ plane are configured such that the types of the key tops 83 can be determined by a relative position with reference to the key tops 83 to which the first physical marks M1 and the second physical mark M2 are attached. The base frame 85 supports the plurality of key tops 83 to allow the plurality of key tops 83 to be pushed down. When the input auxiliary device 13 is mounted on the body 15, an underside 87 (see FIG. 3) of the base frame 85 comes into contact with the touch panel 19.

The cover 69 is formed of a material having a hardness higher than that of the base frame 85. The cover 69 is attached to the frame 65 such that the key unit 67 is sandwiched by the cover 69 and the frame 65. The base frame 85 is formed of, for example, silicon rubber. The cover 69 is formed of, for example, a resin material (for example, polybutylene terephthalate (PBT)). The cover 69 is provided with a plurality of claw portions 89 for fixing the key unit 67 to the frame 65 while sandwiching the key unit 67. The claw portions 89 are locked to a locking portion 91 (see FIG. 3) provided at the front holding piece 77 or the back holding piece 79 of the frame 65. The cover 69 has a plurality of through holes 93 (an example of second through holes) in accordance with the respective key tops 83. The through hole 93 allows a tip end of the key top 83 to pass therethrough when the key top 83 is pushed down. The cover 69 is spaced from the touch panel 19 with a clearance C in a state where the underside 87 of the base frame 85 is in contact with the touch panel 19.

As shown in FIG. 1, the body 15 of the information processing apparatus 11 includes a top wall 95 that is formed in an eaves-like shape by extending the top of the body 15 to the front above the opening portion 43. An under side of the top wall 95 is denoted as a top-wall underside 97 shown in FIG. 3. That is, the front 17 has the top-wall underside 97 extending along the top of the body 15 between the top of the body 15 and the second card slot 27. As shown in FIG. 3, the front holding piece 77 of the frame 65 of the input auxiliary device 13 is locked to the top-wall underside 97 from below. The top wall 95 protruding in the eaves-like shape is a suitable locking portion where the top-wall underside 97 restricts upward separation of the front holding pieces 77.

In addition, as shown in FIG. 3, the front 17 of the body 15 includes a hanging wall 99 hanging down toward the second card slot 27 between the top-wall underside 97 and the second card slot 27. A pair of ribs 101 are formed on a surface of the hanging wall 99. The rib 101 is a ridge extending in a direction substantially perpendicular to an insertion direction of the contact IC card. The rib 101 extends in the up-down direction, and the pair of ribs 101 are provided in parallel to each other on the left and right. A separation distance between the pair of ribs 101 is smaller than a short side of the body 15, which is a front edge of a card (not shown) in the insertion direction. The pair of ribs 101 have a tapered surface for card guide that approaches the hanging wall 99 from the top-wall underside 97 toward the card slot.

Figure 5:
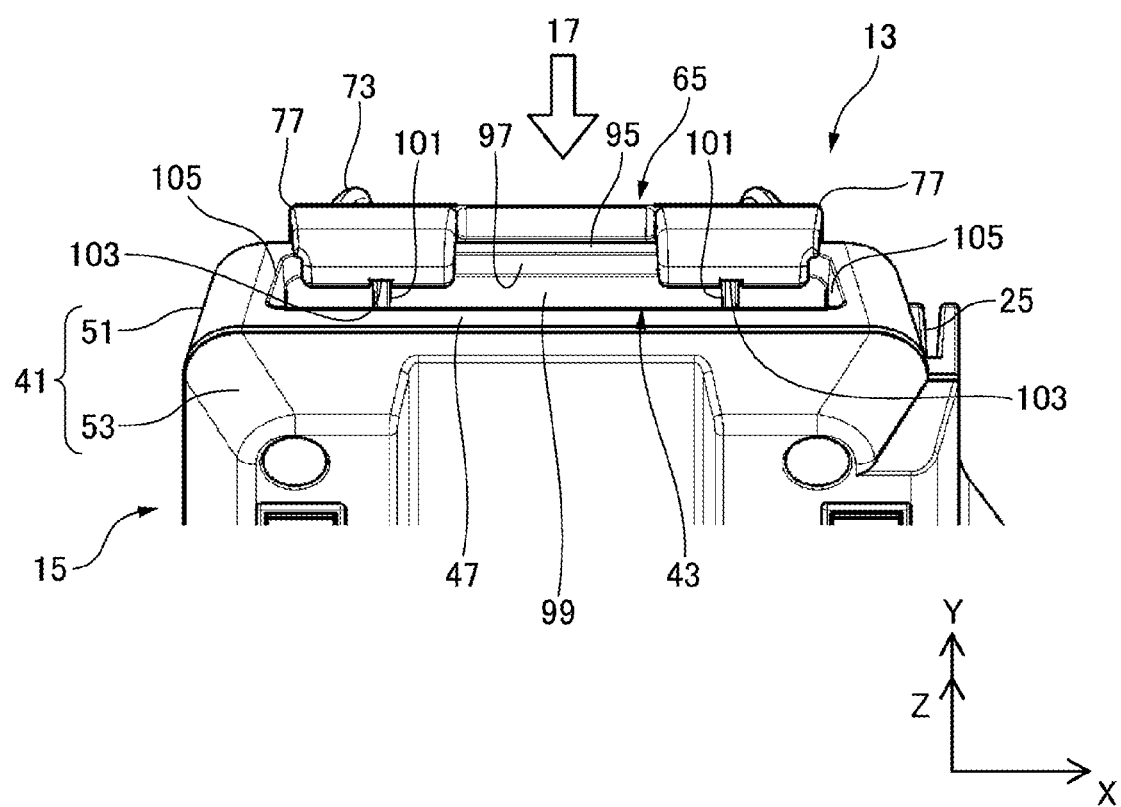
FIG. 5 is a perspective view of a vicinity of a top-wall underside to which front holding pieces are locked as viewed from below.

FIG. 5 is a perspective view of a vicinity of the top-wall underside 97 to which the front holding pieces 77 are locked as viewed from below.

The front holding pieces 77 to be locked to the top-wall underside 97 each have a notch 103 configured to engage the rib 101. The frame 65 is restricted from moving in a direction along a short side of the touch panel 19 (the direction along the X-axis) by engaging the notches 103 provided respectively in the pair of front holding pieces 77 with the ribs 101.

In addition, as shown in FIG. 5, the front 17 includes a pair of left and right sidewalls 105 extending from the body 15 to sandwich the hanging wall 99 therebetween. The pair of left and right front holding pieces 77 are arranged between the pair of sidewalls 105. By engaging the notches 103 with the ribs 101, the front holding pieces 77 are located in the left-right direction, and are restricted from moving. When a large external force in the left-right direction is applied to the input auxiliary device 13, the notches 103 may be separated from the ribs 101, but the front holding pieces 77 separated from the ribs 101 come into contact with either the left or right sidewall 105, and are restricted from further moving. In addition, even in a case where the ribs 101 are not provided, the information processing apparatus 11 can fasten the front holding pieces 77 inside the pair of sidewalls 105 and prevent the frame 65 from being detached in the left-right direction.

Figure 6:
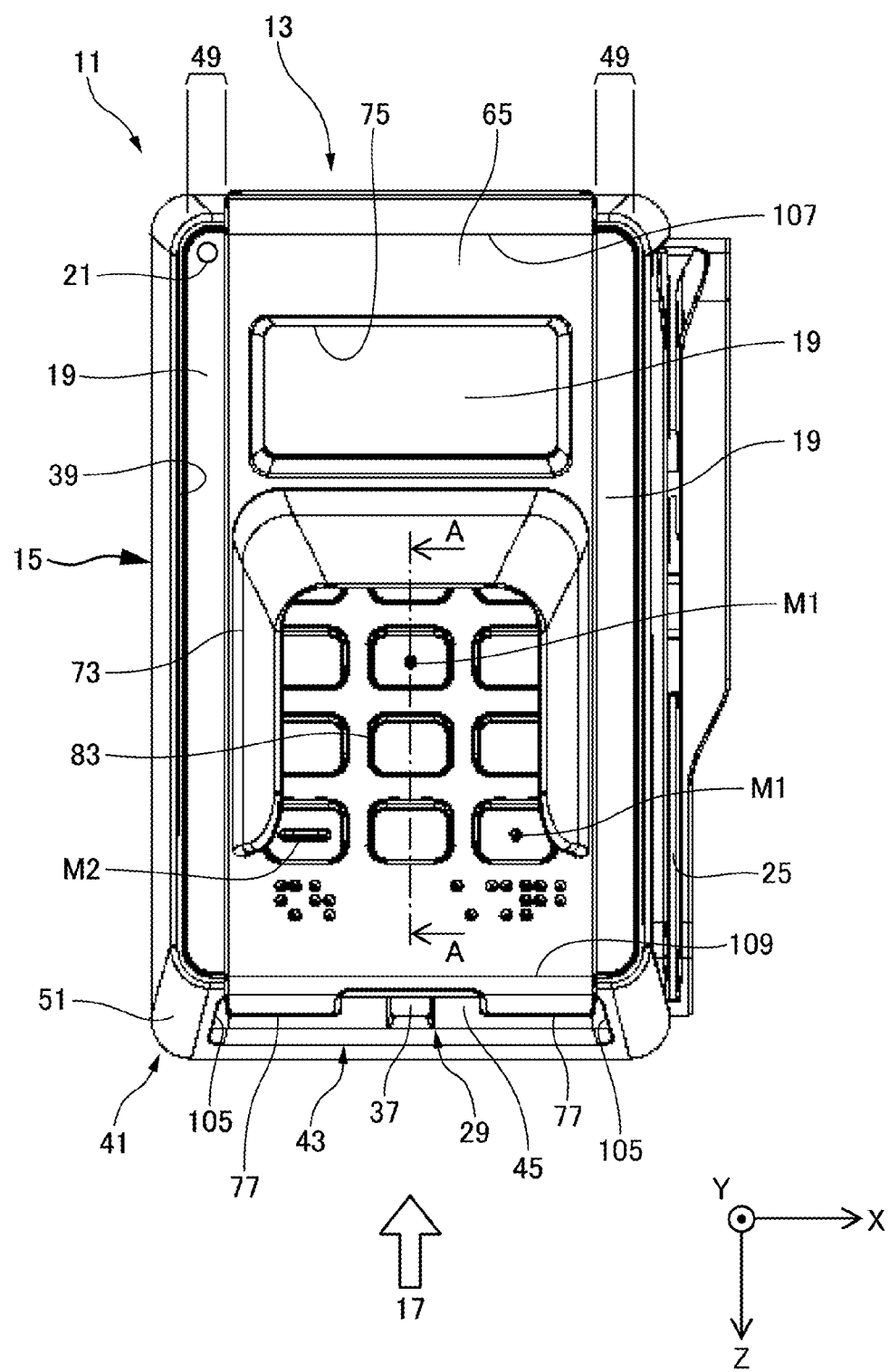
FIG. 6 is a plan view of the information processing apparatus mounted with the input auxiliary device.

FIG. 6 is a plan view of the information processing apparatus 11 mounted with the input auxiliary device 13.

In the input auxiliary device 13 mounted to the information processing apparatus 11, the frame 65 is disposed inside the pair of long sides of the touch panel 19. That is, the left and right edges 49 of the touch panel 19 are exposed between the left and right long sides of the touch panel 19 and the frame 65. By securing the edges 49 of the information processing apparatus 11, for example, when a card is swiped to the first card slot 25, the hood portion 73 of the frame 65 or the like is less likely to interfere with the card.

In addition, the information processing apparatus 11 includes the LED 21 (an example of a light source) on at least one edge 49 of the body 15. In the information processing apparatus 11, the frame 65 of the input auxiliary device 13 is disposed on a central portion of the body 15. Accordingly, the edges 49 of the touch panel 19 are exposed on the left and right sides sandwiching the input auxiliary device 13 therebetween. In the information processing apparatus 11, a part of the display function of the touch panel 19 or the LED 21 may be exposed on the edge 49. At the edge 49, the LED 21 may be hidden behind the frame 65 and may not be exposed.

Next, functions of the above configurations will be described.

The information processing apparatus 11 according to the first embodiment includes the body 15 having the top on which the touch panel 19 is to be disposed, and the input auxiliary device 13 that assists the input by the touch panel 19. The touch panel 19 has a length in the front-back direction (an example of a first direction) longer than a length in the left-right direction (an example of a second direction) perpendicular to the front-back direction. The input auxiliary device 13 includes the frame 65 and the key unit 67. The frame 65 has the plurality of through holes 71, and is mounted on the top of the body 15 by holding the front 17 (an example of one side in the first direction) of the body 15 with the front holding pieces 77 (an example of a first holding piece) and holding the back 31 (an example of the other side in the first direction) of the body 15 with the back holding piece 79 (an example of a second holding piece). The key unit 67 is attached to the backside 81 of the frame 65 facing the touch panel 19. The key unit 67 includes the plurality of key tops 83 made of conductive rubber (an example of a conductive object (for example, an elastic member)) and to be inserted into the through holes 71, respectively, and the base frame 85 that supports the key tops 83 to allow the key tops 83 to be pushed down and has the underside 87 (an example of a first underside) to be in contact with the touch panel 19.

In the information processing apparatus 11, the input auxiliary device 13 is detachably attached on the top of the body 15 on which the touch panel 19 is provided. The top of the body 15 is mostly occupied by the panel arrangement surface 39 of the touch panel 19, except for a small frame-shaped portion surrounding the touch panel 19, for example. The touch panel 19 has a rectangular shape that is long in the front-back direction. Therefore, in the information processing apparatus 11, a direction along the long side of the touch panel 19 is the front-back direction, and a direction along the short side is the left-right direction. The direction along the long side of the touch panel 19 may be slightly inclined from a horizontal plane when the information processing apparatus 11 is placed on a horizontal placement surface.

The input auxiliary device 13 to be attached to the top of the body 15 assists the input by the touch panel 19. When the touch panel 19 is a capacitive touch panel that acquires an operation signal by touching a displayed key with a finger, a visually impaired person who requires physical keys, for example, cannot input a personal identification number. In addition, in a case of the capacitive touch panel, the touch panel 19 does not operate with a simple physical key alone, which does not detect a capacitance of a human body.

Therefore, in the information processing apparatus 11, the input auxiliary device 13 includes at least the frame 65 and the key unit 67. The frame 65 is formed with the front holding pieces 77 and the back holding piece 79 that hold the front 17 and the back 31 of the body 15 therebetween. Accordingly, the frame 65 can be easily attached from above to the top of the body 15 on which the touch panel 19 is provided. Movement of the frame 65 in the front-back direction is restricted by holding the front 17 and the back 31 of the body 15 using the front holding pieces 77 and the back holding piece 79.

In addition, in the key unit 67, the key top 83 protruding upward from the through hole 71 of the frame 65 is supported by the base frame 85 having the underside 87 placed on the touch panel 19. The base frame 85 is made of an elastic insulating material, such as silicon rubber. The base frame 85 can express a feeling of push. The base frame 85 has the underside 87 placed on the touch panel 19, and supports the key top 83 made of conductive rubber at a position where the key top 83 is floated from the touch panel 19.

When the key top 83 protruding from the through hole 71 of the frame 65 is pushed down, the base frame 85 displaces the key top 83 supported at a floating position downward by elastic deformation, and brings the key top 83 into contact with the touch panel 19. When the key top 83 is pushed down by, for example, a finger of a human body, a contact position of the touch panel 19 with the finger is conducted via the key top 83 made of conductive rubber. Accordingly, in the information processing apparatus 11 mounted with the input auxiliary device 13, the touch panel 19 that detects the capacitance can also be operated by using the physical keys.

Since the information processing apparatus 11 can be assembled by holding the front 17 and the back 31 of the body 15 using the front holding pieces 77 and the back holding piece 79 formed at the frame 65 of the input auxiliary device 13, it is not necessary to provide the body 15 with a dedicated fixing portion for fixing the input auxiliary device 13. Therefore, the information processing apparatus 11 can simplify the configuration of the body 15. Therefore, even if the information processing apparatus 11 is equipped with various devices, it is possible to reduce the size of the information processing apparatus 11. In addition, in the information processing apparatus 11, the touch panel 19 can be operated using physical keys of the input auxiliary device 13, and thus even the visually impaired person, for example, can easily perform an input operation on the touch panel 19. Further, the information processing apparatus 11 can be used as a stationary apparatus, and can have both the ease of attachment and detachment of the input auxiliary device 13 to and from the information processing apparatus 11 and the operability at the time of input to the information processing apparatus 11 using the input auxiliary device 13.

In addition, in the information processing apparatus 11, the front 17 may include the second card slot 27 (an example of a card slot) and the top-wall underside 97 (an example of a second underside). The top-wall underside 97 may extend toward the back 31 along the top of the body 15 between the top and the second card slot 27. The front holding pieces 77 may be locked to the top-wall underside 97.

In the information processing apparatus 11, the front holding pieces 77 formed at the frame 65 of the input auxiliary device 13 are locked to the top-wall underside 97 provided on the front 17 of the body 15. The back holding piece 79 of the frame 65 is locked parallel to the back 31 of the body 15. The input auxiliary device 13 does not lock (does not catch) the frame 65 using the front holding pieces 77 and the back holding piece 79 in the left-right direction of the body 15. Therefore, in the information processing apparatus 11, even if various devices (for example, a magnetic card reader) are provided on the left and right sides of the body 15, it is possible to prevent the input auxiliary device 13 from interfering with the use of the devices.

In addition, the second card slot 27 into which the contact IC card is to be inserted is naturally provided in the payment terminal as the information processing apparatus 11. In the information processing apparatus 11, the second card slot 27 is provided, and thus a shape portion (that is, the top-wall underside 97) of the body 15 formed around the body 15 can be effectively used as a locked portion of the front holding pieces 77, and the input auxiliary device 13 can be stably mounted to the information processing apparatus 11. As a result, in the information processing apparatus 11, it is not necessary to separately form, on the body 15, a dedicated portion for locking the input auxiliary device 13, and it is easy to realize further reduction of size.

In addition, in the information processing apparatus 11, the front 17 may include the hanging wall 99 hanging down toward the second card slot 27 and the ribs 101 formed on the hanging wall 99 between the top-wall underside 97 and the second card slot 27. The front holding piece 77 may have the notch 103, and the notch 103 may be engaged with the rib 101 to restrict movement of the frame 65 in the left-right direction.

In the information processing apparatus 11, the hanging wall 99 is provided on the front 17 of the body 15. The hanging wall 99 is formed between the top-wall underside 97 and the second card slot 27, and hangs down, for example, in the direction substantially perpendicular to the insertion direction of the contact IC card to be inserted into the second card slot 27. The ribs 101 are formed on the hanging wall 99.

The rib 101 is the ridge extending in the direction substantially perpendicular to the insertion direction of the card. In the first embodiment, the rib 101 extends in the up-down direction, and the pair of ribs 101 are provided in parallel to each other on the left and right. The separation distance between the pair of ribs 101 is smaller than the short side, which is the front edge of the contact IC card in the insertion direction. The pair of ribs 101 have the tapered surface for card guide that approaches the hanging wall 99 from the top-wall underside 97 toward the card slot. The ribs 101 may be provided to guide the contact IC card such that the contact IC card can be smoothly inserted when being inserted into the second card slot 27 by the user.

In the frame 65 of the input auxiliary device 13, the longitudinal groove-shaped notch 103 to be engaged with the rib 101 is formed in the front holding piece 77 to be locked to the top-wall underside 97. The frame 65 may have the pair of front holding pieces 77 separated from each other in the left-right direction, and the front holding pieces 77 may be provided with the respective notches 103 to be locked to the pair of left and right ribs 101.

Accordingly, the input auxiliary device 13 is mounted on the top of the body 15 such that the movement in the front-back direction is restricted by the front holding pieces 77 and the back holding piece 79 of the frame 65, and the movement in the left-right direction is restricted by the notches 103 engaged with the ribs 101.

An example has been described in which the pair of ribs 101 provided on the front 17 of the body 15 are used to guide the insertion of the contact IC card, but any number of ribs 101 may be provided on the back 31, for example. In this case, the back holding piece 79 is provided with the same notch 103 to be locked to the rib 101 as described above.

Instead of being along the direction (for example, the vertical direction or the Y-axis direction) perpendicular to the insertion direction of the contact IC card, the hanging wall 99 may be a surface (tapered surface) inclined with respect to the perpendicular direction or a horizontal direction. For example, the surface may be inclined to approach the back 31 from the top-wall underside 97 toward the second card slot 27. The tapered surface may be provided to guide the contact IC card such that the contact IC card can be smoothly inserted when being inserted into the second card slot 27 by the user.

In addition, in the information processing apparatus 11, the front 17 may include the pair of left and right sidewalls 105 extending from the body 15 to sandwich the hanging wall 99 therebetween. The front holding pieces 77 may be arranged between the pair of sidewalls 105.

In the information processing apparatus 11, the body 15 includes the pair of left and right sidewalls 105 on the front 17. Each sidewall 105 has an outer surface as an outer surface of the body 15, and extends in the front-back direction. In the information processing apparatus 11, the first card slot 25 may be provided to further protrude from the outer surface on the right side of the body 15. The front 17 of the body 15 is provided with the second card slot 27 sandwiched by the pair of sidewalls 105. In other words, in the front 17 of the body 15, the opening portion 43 having the second card slot 27 on a back side is formed between the pair of sidewalls 105. The diameter of the opening portion 43 increases from the back toward the front. In the opening portion 43, the second card slot 27 is located at the part on the backmost side.

The pair of front holding pieces 77 formed at the frame 65 are inserted into the opening portion 43 and locked to the top-wall underside 97. The top-wall underside 97 is the underside of the top wall 95. The top wall 95 protrudes in the eaves-like shape above the opening portion 43 by extending the top of the body 15 to the front. The top wall 95 protrudes in the eaves-like shape, and thus is a suitable portion for restricting the upward separation as the locking portion 91 of the front holding piece 77.

Figure 7:
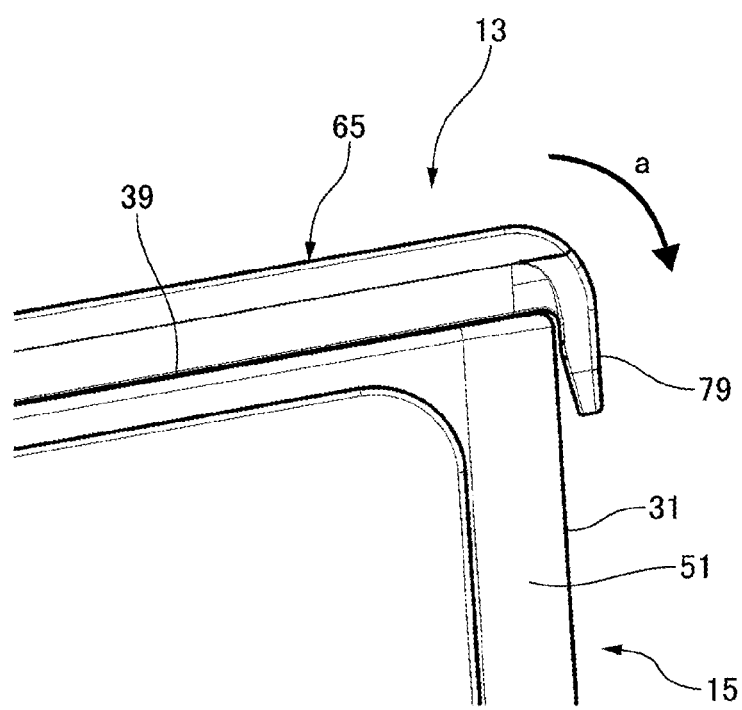
FIG. 7 is a side view of a back holding piece to be locked to a back.
Figure 7:
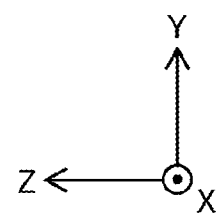

FIG. 7 is a side view of the back holding piece 79 to be locked to the back 31.

Accordingly, when the frame 65 is to be mounted, first, the front holding pieces 77 are locked to the top-wall underside 97 from the front, and then the back holding piece 79 is locked to the back 31 by rotating the back holding piece toward a touch panel side (see an arrow a in FIG. 7) with the front holding pieces 77 as fulcrums. In addition, when the frame 65 is to be detached from the body 15, first, the back holding piece 79 is moved upward in a direction along the back 31, and after the back holding piece 79 is detached from the back 31, the front holding pieces 77 are moved forward to release the lock between the front holding pieces 77 and the top-wall underside 97, thereby completing the detachment.

When the input auxiliary device 13 is mounted to the body 15, the front holding pieces 77 of the frame 65 are inserted into the opening portion 43 sandwiched by the pair of sidewalls 105. Therefore, in the input auxiliary device 13, for example, even when a large external force in the left-right direction is applied in a state where the front holding pieces 77 are locked to the top-wall underside 97, and the notches 103 are detached from the ribs 101, the front holding pieces 77 come into contact with either the left or right sidewall 105, and thus the frame 65 is restricted from being detached from the left and right of the body 15.

In addition, in the information processing apparatus 11, the frame 65 may be disposed inside the pair of long sides (an example of a pair of sides along the first direction) of the touch panel 19.

In the information processing apparatus 11, a length of the frame 65 of the input auxiliary device 13 in the left-right direction is shorter than a length of the touch panel 19 in the left-right direction. Therefore, in the input auxiliary device 13 mounted to a normal position of the body 15, the touch panel 19 is exposed (for example, slightly exposed) on the left and right of the frame 65. In addition, the input auxiliary device 13 covers the body 15 only in the front-back direction by the front holding pieces 77 and the back holding piece 79, and thus is in a free state of not being locked in the left-right direction (the left and right sides of the frame 65 are simply arranged along the long sides of the touch panel 19 on an inner side thereof). Therefore, even when the input auxiliary device 13 is mounted, a part of the touch panel 19 can be visually recognized. Accordingly, the input auxiliary device 13 can prevent a decrease in user operability (operability of a swipe operation of a magnetic card) with respect to a device (for example, a magnetic card reader) located outside the touch panel 19 in the left-right direction.

In addition, in the information processing apparatus 11, the body 15 includes the light source (for example, the LED 21) on at least one edge 49 in the left-right direction, and the frame 65 is disposed closer to the central portion of the body 15 than the light source.

In the information processing apparatus 11, the body 15 includes the light source on at least one edge 49 in the left-right direction. Here, the edges 49 refer to left and right exposed portions of the top of the body 15 exposed in a form of a quadrangular frame around the touch panel 19, excluding a portion overlaid by a back edge 107 and a front edge 109 of the frame 65 and covered by the frame 65 shown in FIG. 6. In the input auxiliary device 13, the edge 49 can be exposed, and thus the light source located on the edge 49 can be exposed, and the light source can be visually recognized without being hidden by the input auxiliary device 13.

In addition, in the information processing apparatus 11, the input auxiliary device 13 may include the cover 69 that has a hardness higher than that of the base frame 85 and is attachable to the frame 65 such that the key unit 67 is sandwiched by the cover 69 and the frame 65. The cover 69 may have the plurality of through holes 93 corresponding to the respective key tops 83, and may be spaced from the touch panel 19 in the state where the underside 87 of the base frame 85 is in contact with the touch panel 19.

Figure 8:
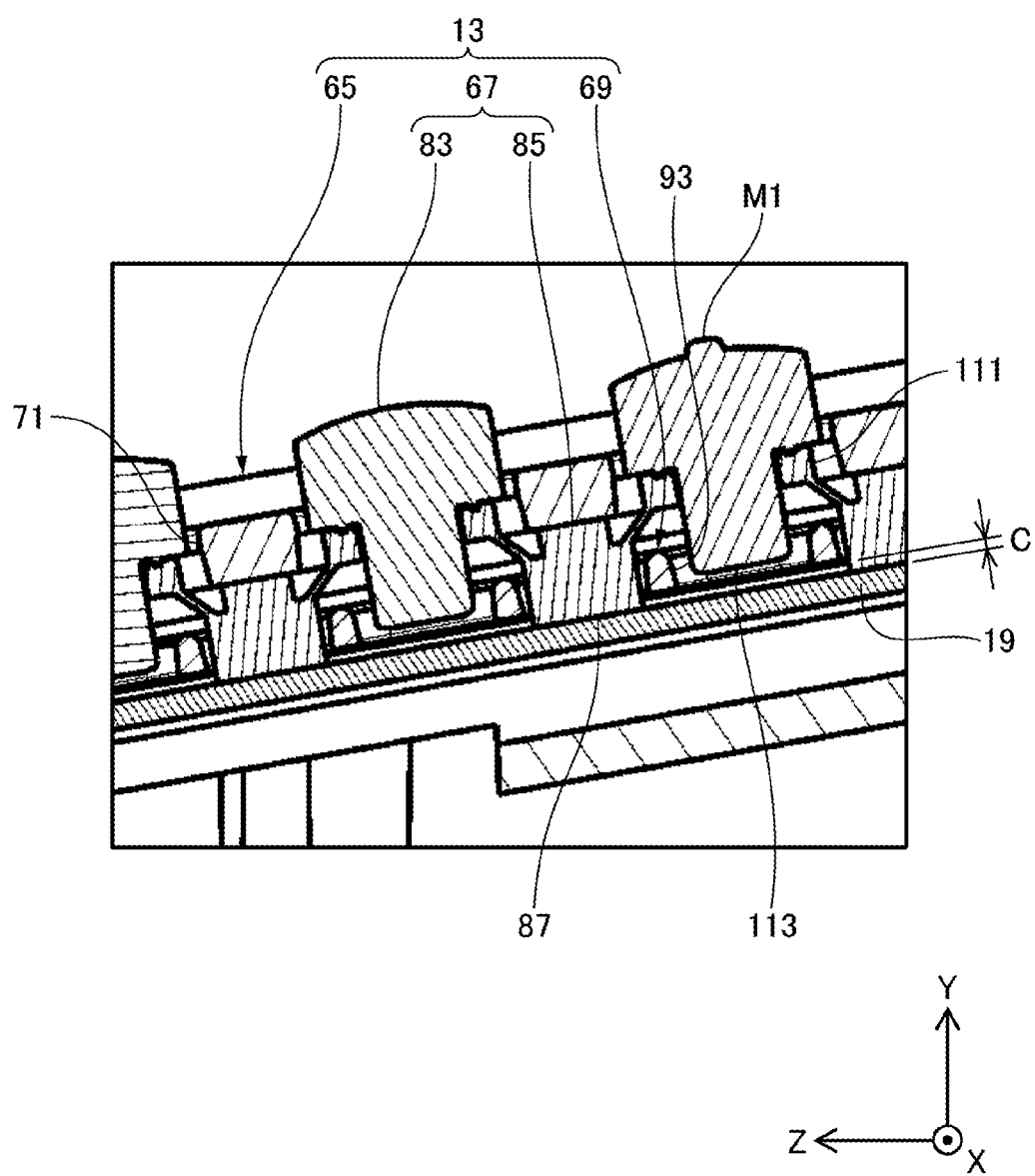
FIG. 8 is a cross-sectional view taken along a line A-A of FIG. 6.

FIG. 8 is a cross-sectional view taken along a line A-A of FIG. 6.

In the information processing apparatus 11, the cover 69 is attached to the frame 65 of the key unit 67 when the input auxiliary device 13 is mounted to the body 15. In the key unit 67, the underside 87 of the base frame 85 is located closer to the touch panel side than the cover 69 and is in contact with the touch panel 19. The cover 69 is fixed to the frame 65 at a position above the underside 87 of the base frame 85. That is, in the information processing apparatus 11, the clearance C is provided between the cover 69 and the touch panel 19 when the input auxiliary device 13 is mounted. By providing the clearance C, the cover 69 does not come into contact with the touch panel 19. Therefore, the cover 69, which is harder than the key tops 83 and the base frame 85, can prevent the touch panel 19 from being damaged.

In the key unit 67, in a state where the cover 69 is spaced from the touch panel 19 with the clearance C, the key top 83 is supported by a key support portion 111 of the base frame 85 that is elastically deformable in a pushing direction. In the key top 83 supported by the key support portion 111, a key underside 113 as an electrostatic contact is spaced from the touch panel 19 by a distance larger than the clearance C. A separation distance of the key top 83 is a stroke when the key top 83 is pushed down.

In addition, the input auxiliary device 13 in the first embodiment is mounted on the top of the body 15 of the information processing apparatus 11 in which the touch panel 19 is to be disposed on the top, and assists the input by the touch panel 19. The touch panel 19 has the length in the front-back direction longer than the length in the left-right direction perpendicular to the front-back direction. The input auxiliary device 13 includes the frame 65 and the key unit 67. The frame 65 has the plurality of through holes 71, and is mounted on the top of the body 15 by holding the front 17 of the body 15 with the front holding pieces 77 and holding the back 31 of the body 15 with the back holding piece 79. The key unit 67 is attached to the backside 81 of the frame 65 facing the touch panel 19. The key unit 67 includes the plurality of key tops 83 made of conductive rubber and to be inserted into the through holes 71, respectively, and the base frame 85 that supports the key tops 83 to allow the key tops 83 to be pushed down and has the underside 87 to be in contact with the touch panel 19.

The input auxiliary device 13 assists the input by the touch panel 19. When the touch panel 19 is the capacitive touch panel that acquires the operation signal by touching the displayed key with the finger, the visually impaired person who requires the physical keys, for example, cannot input the personal identification number. In addition, in the case of the capacitive touch panel, the touch panel 19 does not operate with the simple physical key alone, which cannot detect the capacitance of the human body.

The input auxiliary device 13 includes at least the frame 65 and the key unit 67. The frame 65 is formed with the front holding pieces 77 and the back holding piece 79 that hold the front 17 and the back 31 of the information processing apparatus 11 therebetween. Accordingly, the frame 65 can be easily attached from above to the top of the information processing apparatus 11 on which the touch panel 19 is provided. The movement of the frame 65 in the front-back direction is restricted by holding the front 17 and the back 31 of the information processing apparatus 11 using the front holding pieces 77 and the back holding piece 79.

In addition, in the key unit 67, the key top 83, which is a physical key protruding upward from the through hole 71 of the frame 65, is supported by the base frame 85 having the underside 87 placed on the touch panel 19. Here, the base frame 85 is made of the elastic insulating material, such as silicon rubber. The base frame 85 having the underside 87 placed on the touch panel 19 supports the key top 83 made of conductive rubber at a position where the key top 83 is floated from the touch panel 19.

When the key top 83 protruding from the through hole 71 of the frame 65 is pushed down, the base frame 85 displaces the key top 83 supported at the floating position downward by elastic deformation, and brings the key top 83 into contact with the touch panel 19. When the key top 83 is pushed down by, for example, the finger of the human body, the contact position of the touch panel 19 with the finger is conducted via the key top 83 made of conductive rubber. Accordingly, in the information processing apparatus 11 mounted with the input auxiliary device 13, the touch panel 19 that detects the capacitance can also be operated by using the physical keys.

Since the input auxiliary device 13 can be attached by holding the front 17 and the back 31 of the information processing apparatus 11 using the front holding pieces 77 and the back holding piece 79 formed at the frame 65, it is not necessary to provide the information processing apparatus 11 with the dedicated fixing portion for fixing the input auxiliary device 13. Therefore, the input auxiliary device 13 can simplify the configuration of the information processing apparatus 11. Therefore, even if the information processing apparatus 11 is equipped with various devices, the input auxiliary device 13 can reduce the size of the information processing apparatus 11. In addition, the touch panel 19 can be operated using the physical keys, and thus the input auxiliary device 13 can assist the visually impaired person, for example, in performing the input operation on the touch panel 19.

Therefore, according to the information processing apparatus 11 and the input auxiliary device 13 in the first embodiment, the input by the touch panel 19 can be assisted, and the size of the information processing apparatus 11 including the touch panel 19 can be reduced while the information processing apparatus 11 is equipped with various devices.

In the present embodiment, an example has been described in which on the front 17, the front holding pieces 77 include two front holding pieces 77 in the left-right direction, and the front holding pieces 77 are formed to be curved along the top wall 95 to the top-wall underside 97. The back 31 may have the same configuration as that of the front 17. Specifically, the back holding piece 79 may be divided into two pieces in the left-right direction. In addition, the body 15 may include, on the back 31, the same top wall as the top wall 95 on the front 17, and the back holding piece 79 may be formed to be curved along the top wall to a top-wall underside which is an underside of the top wall. Further, the front holding pieces 77 on the front 17 may not be separated in the left-right direction, and one front holding piece 77 may be provided, for example, at the central portion in the left-right direction.

In addition, in the present embodiment, an example has been described in which the front 17 includes the second card slot 27, and the top-wall underside 97 extending toward the back 31 along the top of the body 15 between the top and the second card slot 27, and the front holding pieces 77 are locked to the top-wall underside 97, but the present disclosure is not limited to this example. For example, a shape from the top of the body 15 to the second card slot 27 may be a tapered shape (tapered surface). In this case, the front holding pieces 77 are locked by the tapered surface. In addition, the top-wall underside 97 may not exist, and the top of the body 15 may be directly connected to the hanging wall 99.

Modification

Figure 9:
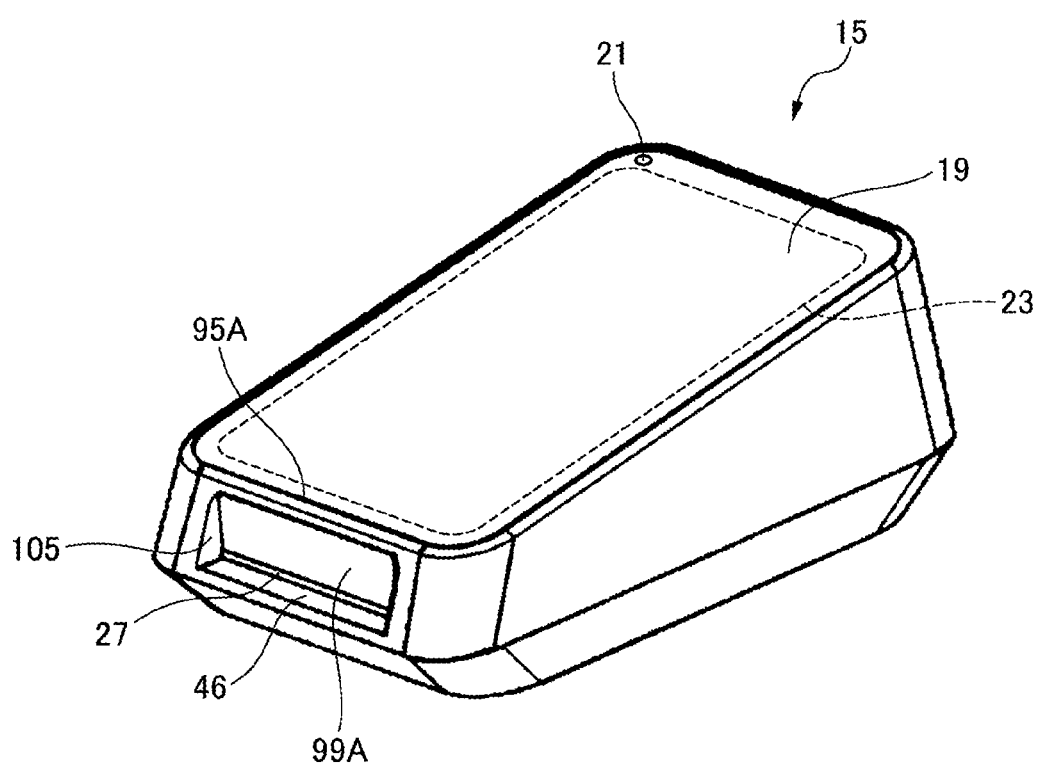
FIG. 9 is a perspective view illustrating an external appearance of a body of an information processing apparatus according to a first modification.
Figure 10:
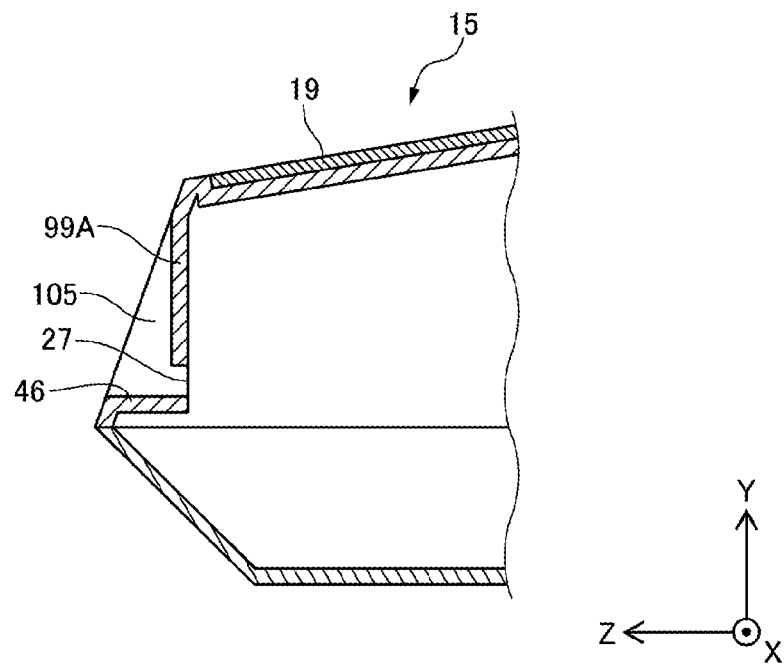
FIG. 10 is a schematic cross-sectional view obtained by notching a vicinity of an opening portion of the body in the first modification in the YZ plane.
Figure 11:
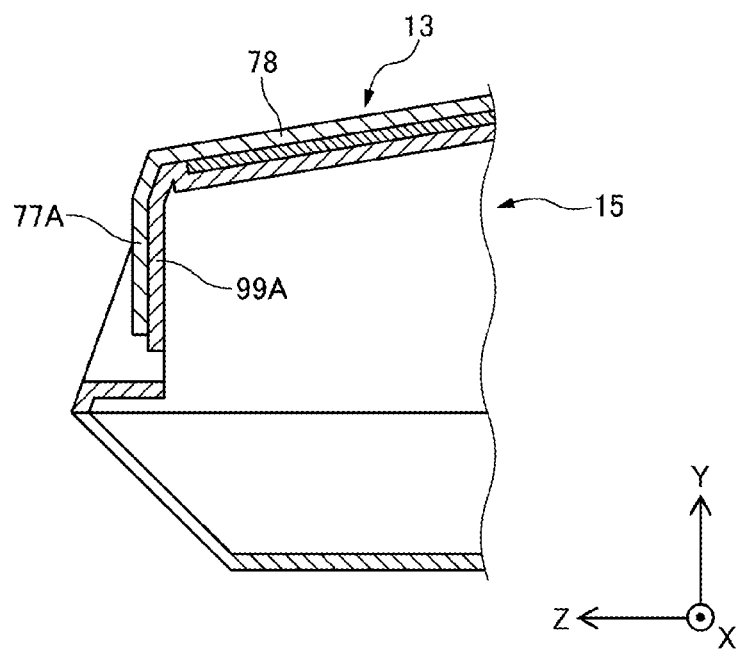
FIG. 11 is a schematic cross-sectional view obtained by notching the body mounted with an input auxiliary device in the first modification in the YZ plane.

FIG. 9 is a perspective view illustrating an external appearance of the body 15 of the information processing apparatus 11 according to a first modification. FIG. 10 is a schematic cross-sectional view obtained by notching the vicinity of the opening portion 43 (see FIG. 1) of the body 15 in the first modification in the YZ plane. FIG. 11 is a schematic cross-sectional view obtained by notching the body 15 mounted with the input auxiliary device 13 in the first modification in the YZ plane. In the first modification, differences from the information processing apparatus 11 according to the first embodiment will be mainly described. In the information processing apparatus 11 according to the first modification, the same configurations as those of the information processing apparatus 11 in FIG. 1 and the like will be described using the same reference numerals.

In the information processing apparatus 11 according to the first modification, a top wall 95A on the front 17 of the body 15 does not extend forward, and does not protrude in an eaves-like shape above the opening portion 43. In addition, instead of the inclined lower surface 45, a horizontal underside 46 is disposed at the lower portion of the periphery of the opening portion 43. The horizontal underside 46 is parallel to the insertion direction of the contact IC card into the second card slot 27, and is disposed along the horizontal direction when the information processing apparatus 11 is placed on a horizontal table. A hanging wall 99A extends from the top wall 95A toward the second card slot 27 along a direction perpendicular to the horizontal underside 46 (that is, along the vertical direction) or slightly inclined from the perpendicular direction.

The frame 65 (see FIG. 1) of the input auxiliary device 13 includes a front holding piece 77A, a back holding piece 79, and a front-back connection portion 78 that connects the front holding piece 77A and the back holding piece 79. The front-back connection portion 78 is provided with the plurality of through holes 71 and the window 75 described above.

In the first modification, the input auxiliary device 13 is mounted from above the body 15 including the top wall 95A and the hanging wall 99A. In a state where the input auxiliary device 13 is mounted on the body 15, the front holding piece 77A is disposed along the hanging wall 99A of the body 15. Therefore, the input auxiliary device 13 holds the front and the back of the body 15 from above by the front holding piece 77A and the back holding piece 79. Accordingly, the input auxiliary device 13 is restricted from moving in the front-back direction with respect to the body 15, and can prevent the frame 65 from being detached from the body 15 in the front-back direction.

A member may not exist between the hanging wall 99A and the front holding piece 77A, but a member that generates a frictional force (a frictional force generating member, for example, a rubber member) may be disposed, for example. The frictional force generating member may be disposed on the front of the hanging wall 99A (a side facing the front holding piece 77A), or may be disposed on the back of the front holding piece 77A (a side facing the hanging wall 99A). The frictional force generating member generates a frictional force in at least one of the up-down direction and the left-right direction when the hanging wall 99A and the front holding piece 77A are in contact with each other, so that the front holding piece 77A is less likely to slip in at least one of the up-down direction and the left-right direction with respect to the hanging wall 99A, and the movement can be restricted. Therefore, by providing the frictional force generating member, the input auxiliary device 13 is restricted from moving in at least one of the front-back direction and the left-right direction with respect to the body 15, and can prevent the frame 65 from being detached from the body 15 in each of the directions (the front-back direction, the up-down direction, and the left-right direction). The movement in the left-right direction may be restricted by the sidewalls 105 of the body 15 instead of the frictional force generating member. Instead of providing the frictional force generating member as a separate member, the hanging wall 99A itself or the front holding piece 77A itself may be processed to generate a frictional force.

As described above, the front 17 (an example of one side) of the information processing apparatus 11 may include the second card slot 27, and the hanging wall 99A (an example of a second hanging wall) hanging from the front (an example of one side) of the top of the body 15 toward the second card slot 27. The front holding piece 77A may be locked to the hanging wall 99A by a frictional force.

Figure 12:
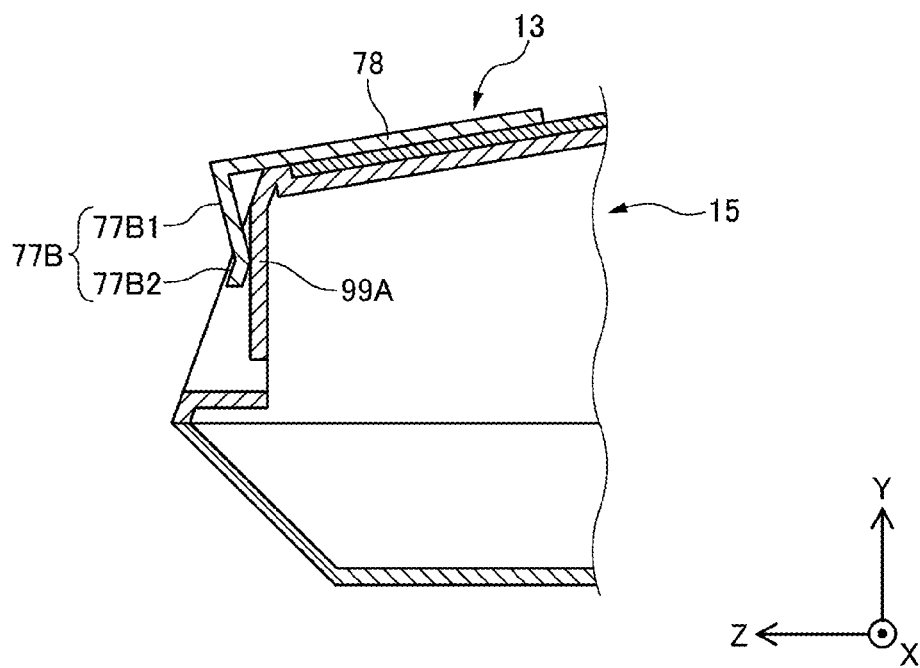
FIG. 12 is a schematic cross-sectional view obtained by notching a body mounted with an input auxiliary device in a second modification in the YZ plane.
Figure 13:
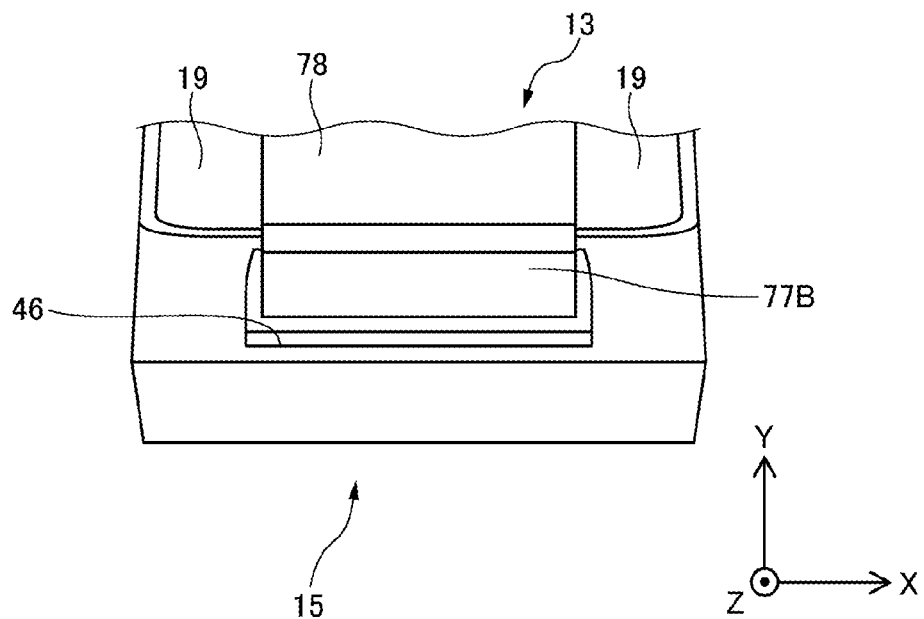
FIG. 13 is a front view illustrating a body mounted with an input auxiliary device in the second modification.

FIG. 12 is a schematic cross-sectional view obtained by notching the body 15 mounted with the input auxiliary device 13 in a second modification in the YZ plane. FIG. 13 is a front view illustrating the body 15 mounted with the input auxiliary device 13 in the second modification. In the second modification, the body 15 of the information processing apparatus 11 includes the top wall 95A and the hanging wall 99A as in the first modification, but a shape of the input auxiliary device 13 is different from that in the first modification. In the second modification, the same configurations as those in the first modification are denoted by the same reference numerals, and the description thereof will be omitted or simplified.

In the second modification, a front holding piece 77B of the frame 65 of the input auxiliary device 13 includes a first portion 77B1 and a second portion 77B2. The first portion 77B1 and the second portion 77B2 are formed in a flat plate shape, and are bent at a connection portion between the first portion 77B1 and the second portion 77B2. In the front holding piece 77B, the connection portion (bent portion) between the first portion 77B1 and the second portion 77B2 is in contact with the hanging wall 99A in the state where the input auxiliary device 13 is mounted on the body 15. The front holding piece 77B has an elastic force, and urges the hanging wall 99A toward the back by the connection portion between the first portion 77B1 and the second portion 77B2. Although the front-back connection portion 78 is partially omitted in FIG. 12, the front-back connection portion 78 extends to the back holding piece 79 and is connected to the back holding piece 79.

The back holding piece 79 of the frame 65 of the input auxiliary device 13 mounted to the body 15 is in the same state as in FIG. 7. Therefore, the input auxiliary device 13 holds the front and the back of the body 15 from above by the front holding piece 77B and the back holding piece 79. Accordingly, the input auxiliary device 13 is restricted from moving in the front-back direction with respect to the body 15, and can prevent the frame 65 from being detached from the body 15 in the front-back direction. In addition, the front holding piece 77B urges the hanging wall 99A toward the back by a urging force, and thus the input auxiliary device 13 can be locked to the body 15 like a clip, and can prevent the frame 65 from being detached from the body 15 in each of the directions (the front-back direction, the up-down direction, and the left-right direction).

As described above, the front 17 of the information processing apparatus 11 may include the second card slot 27, and the hanging wall 99A hanging down from the front of the top of the body 15 toward the second card slot 27. The front holding piece 77B may be locked to the hanging wall 99A by the urging force from the front holding piece 77B toward the hanging wall 99A.

The configurations shown in the first embodiment and the configurations shown in the first and second modifications can be combined. For example, also in the modifications, the hanging wall 99A may include the rib 101, the front holding pieces 77A and 77B may include the notch 103, and the rib 101 and the notch 103 may be engaged with each other to restrict the movement of the frame 65 in the left-right direction. For example, also in the modifications, the front 17 may include the pair of sidewalls 105 extending from the body 15 to sandwich the hanging wall 99A therebetween, and being along the left-right direction, and the front holding pieces 77A and 77B may be disposed between the pair of sidewalls 105. For example, also in the modifications, the frame 65 may be disposed inside a pair of sides of the touch panel 19 along the front-back direction. In addition, also in the modifications, the body 15 may include the LED 21 on at least one edge thereof in the left-right direction, and the frame 65 may be disposed closer to the central portion of the body 15 than the LED 21.

Although various embodiments have been described above with reference to the drawings, it is needless to say that the present disclosure is not limited to such examples. It will be apparent that those skilled in the art can conceive of various modifications and alterations within the scope described in the claims, and it is understood that such modifications and alterations naturally belong to the technical scope of the present disclosure. In addition, the respective constituent elements in the above-described embodiments may be combined as desired without departing from the scope of the present disclosure.

The invention claimed is:

1. An information processing apparatus comprising:
    a body having a top configured to allow a touch panel to be disposed thereon; and
    an input auxiliary device configured to assist input by the touch panel,
    wherein the touch panel has a length in a first direction longer than a length in a second direction perpendicular to the first direction,
    wherein the input auxiliary device comprises:
        a frame having a plurality of first through holes, the frame comprising a first holding piece configured to hold one side of the body in the first direction and a second holding piece configured to hold another side of the body in the first direction to mount the frame on the top; and
        a key unit attachable to a backside of the frame facing the touch panel,
    wherein the key unit comprises:
        a plurality of key tops formed of a conductive object, the plurality of key tops being configured to be inserted into the first through holes, respectively; and
        a base frame configured to support the plurality of key tops to allow the plurality of key tops to be pushed down, the base frame having a first underside facing the touch panel, the first underside being configured to contact the touch panel,
    wherein the one side comprises:
        a card slot; and
        a second underside extending along the top toward the another side between the top and the card slot, and
    wherein the first holding piece is configured to be locked to the second underside.

2. The information processing apparatus according to claim 1,
    wherein the one side comprises a hanging wall hanging down toward the card slot between the second underside and the card slot.

3. The information processing apparatus according to claim 2, further comprising:
    a rib formed on the hanging wall,
    wherein the first holding piece has a notch, the notch being configured to engage the rib to restrict movement of the frame in the second direction.

4. The information processing apparatus according to claim 2,
    wherein the one side comprises a pair of sidewalls extending along the second direction from the body to sandwich the hanging wall therebetween, and
    wherein the first holding piece is disposed between the pair of sidewalls.

5. The information processing apparatus according to claim 1,
    wherein the frame is disposed inside a pair of sides of the touch panel along the first direction.

6. The information processing apparatus according to claim 5,
    wherein the body comprises a light source on at least one edge thereof in the second direction, and
    wherein the frame is disposed closer to a central portion of the body than the light source.

7. The information processing apparatus according to claim 1,
    wherein the input auxiliary device comprises a cover having a hardness higher than that of the base frame, and the cover being attachable to the frame such that the key unit is sandwiched by the cover and the frame, and
    wherein the cover has a plurality of second through holes in accordance with the respective key tops, the cover being spaced from the touch panel in a state where the first underside of the base frame contacts the touch panel.

8. The information processing apparatus according to claim 1,
    wherein the object is an elastic member.

* * * * *